Jan. 12, 1960    SHINJIRO IZUMI    2,920,431
BOTTLE-HOODING APPARATUS
Filed June 12, 1957    3 Sheets-Sheet 1

INVENTOR
SHINJIRO IZUMI
BY

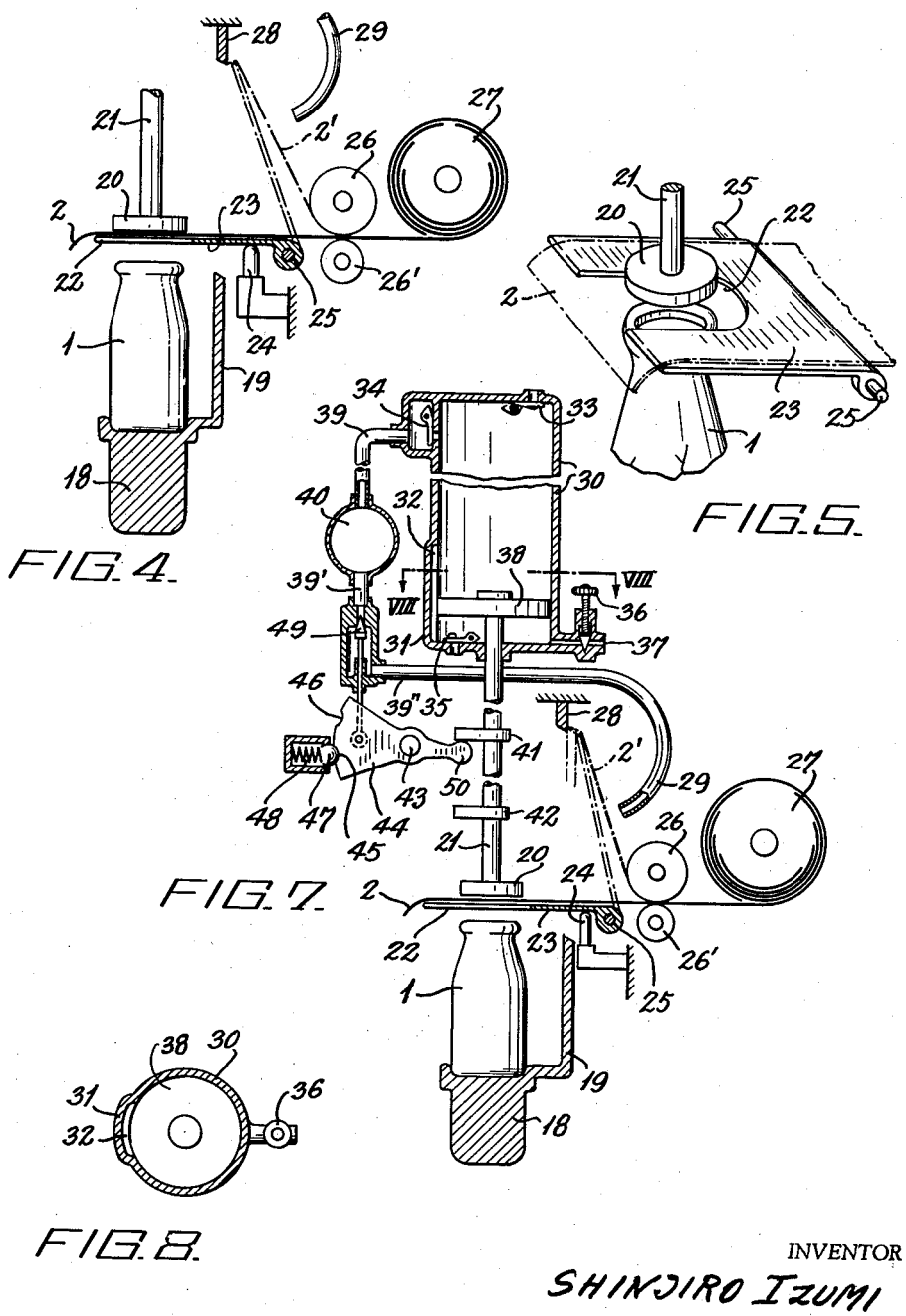

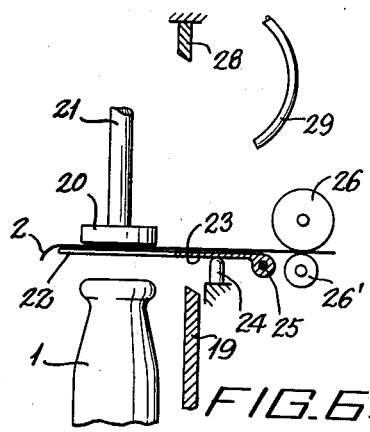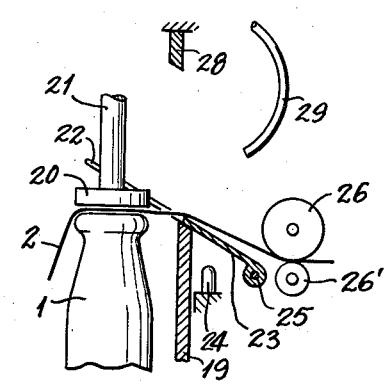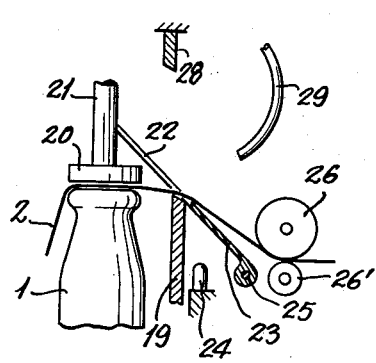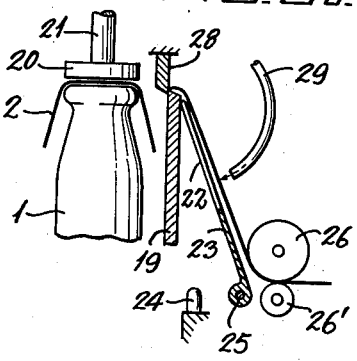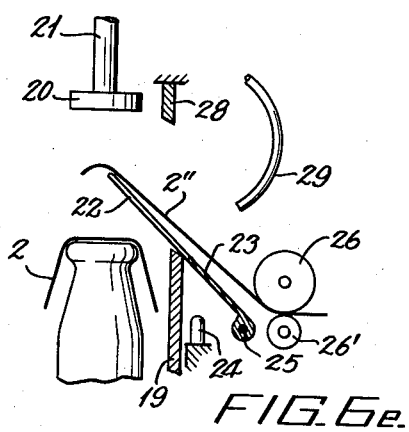

United States Patent Office 2,920,431
Patented Jan. 12, 1960

2,920,431

BOTTLE-HOODING APPARATUS

Shinjiro Izumi, Urawa, Japan

Application June 12, 1957, Serial No. 665,249

Claims priority, application Japan December 26, 1956

8 Claims. (Cl. 53—141)

This invention relates to a bottle-hooding apparatus, for example, for a milk plant.

An object of this invention is to provide a simply and automatically operated hygienic bottle-hooding apparatus. In accordance with the concept of the invention the apparatus comprises in combination means for transporting bottle to be hooded one after another, means for lifting each bottle on the transporting way up to a required position, means for receiving the top portion of the bottle in said position onto which portion a hooding sheet piece capable of becoming sticky by heating has been placed and sticking then said sheet piece onto said top portion of the bottle by blowing heating gas or steam against the hooding sheet piece around said top portion, and means for synchronizing lifting movement of the bottle with said blowing of the heating gas or steam.

Another object of this invention is to provide for this bottle-hooding apparatus an automatic feed arrangement for hooding sheet pieces which comprises vertically movable bottle carriage, vertically movable means cooperating with said carriage for holding fast the free end of a hooding sheet band between it and the top portion of a bottle and pulling out said band when said carriage ascends, and means for cutting off from said band a piece of a required length.

A further object of this invention is to provide also for this bottle-hooding apparatus means for preventing said sheet band from falling down from its guide part immediately after cutting of the sheet band.

Figure 1A:
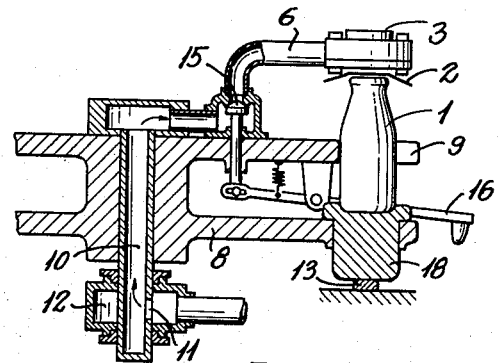
Figure 2A:
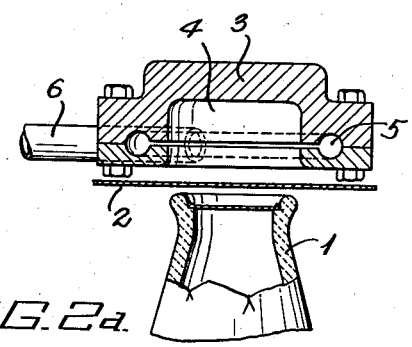
Figure 1B:
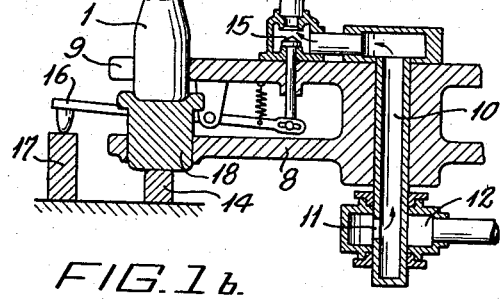
Figure 2B:
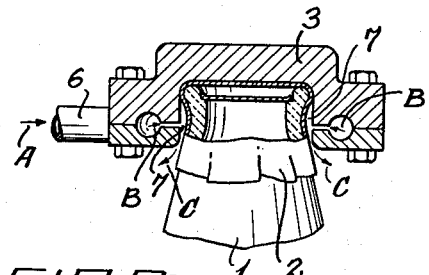
Figure 3:
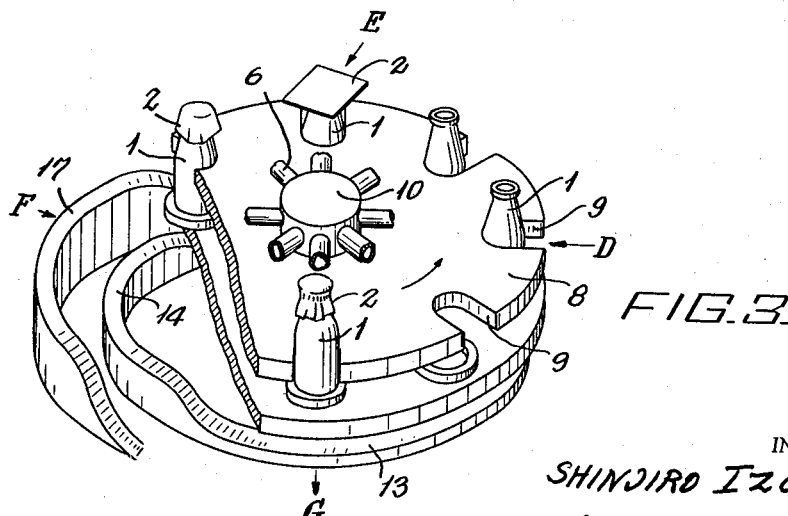

The accompanying drawing shows one embodiment of the bottle-hooding apparatus according to this invention, wherein Fig. 1a is a vertical sectional view of the main parts of said embodiment, Fig. 1b is a vertical sectional view of the same, showing an operating state somewhat different from that shown in Fig. 1a, Fig. 2a is a vertical sectional view of a part of the same, in an enlarged size, Fig. 2b is a vertical view of the same part as in Fig. 2a but in an operating state different from that shown in the latter, Fig. 3 is a perspective view of the parts shown in Fig. 1, Fig. 4 is a schematic vertical sectional view of an automatic feed arrangement for hooding sheet pieces, Fig. 5 is a perspective view of some parts of the arrangement shown in Fig. 4, Fig. 6a–6e show schematically five different operating states of the automatic feed arrangement shown in Fig. 4, Fig. 7 is a schematic vertical sectional view of the automatic feed arrangement together with means for holding fast a hooding sheet band onto a guide plate of said arrangement and Fig. 8 is a sectional plan view along line VIII—VIII in Fig. 7.

Referring to Figs. 1a and 1b, 8 denotes a turn table of an approximately I-shaped longitudinal section and in the peripheral edge of the upper part of this table several radial recesses 9 are cut away equidistantly to receive fast bottles 1 to be hooded. Directly below these recesses vertically movable bottle carriages 18 of piston type are inserted into corresponding holes in the lower part of the turn table which is to be driven by a suitable prime mover, such as an electric motor. A main feed pipe 10 for a heating gas or steam is fixed to the central bore of the turn table and is rotated together with the table in the direction shown by arrows in the drawing. This turn table is a main part of means for transporting bottles.

An annular stationary cam 13 is arranged below the turn table 8 concentrically to the latter, whereby the carriages 18 sliding on the cam 13 are moved vertically, resulting in vertical movement of bottles placed on the carriages. Fig. 1b shows the uppermost position of a bottle placed on the carriage 18 which is sliding then on the highest face 14 of the cam 13. Thus, each bottle to be hooded is lifted up to a required position on the way of transport.

In Figs. 2a and 2b, 3 denotes a cap body having a bore 4 opening below to receive the top (mouth and neck) portion of a bottle 1. This cap body 3 consists of two parts clamped together by bolts and nuts, as shown, and having an annular horizontal passage 5 formed therebetween which communicates with the bore 4 along its total circumference by a slit of 0.1–0.2 mm. width. Thus, the cap body 3 has an annular passage 5 formed in its circumferential wall and communicating along its total circumference with the bore 4. This passage 5 communicates also with a suitable source of heating gas or steam (not shown) through a supply pipe 6. The cap body 3 is dimensioned in such a manner that when the top portion of a bottle onto which a hooding sheet piece 2 has been placed suitably is received in the bore 4, there is left a narrow annular space 7 between the inside face of the bore 4 and the piece 2, as shown in Fig. 2b, through which heating gas under pressure supplied in the direction of arrow A through the supply pipe 6 is blown from the annular passage 5 against the hooding sheet piece 2 around the top portion of the bottle 1 as shown by arrow B and then can escape outwardly as shown by arrow C. It is necessary and important to determine size of this annular space 7 suitably, because if this space 7 is enlarged too much, not only blowing pressure of the heating gas is weakened but also useful heat of the heating gas decreases, resulting in a remarkable heat loss. The hooding sheet piece 2 is of a nature capable of becoming sticky when it is heated, and may be made of synthetic resins, such as polyethylene. A good result was obtained by an experiment in which in order to stick a hooding sheet piece of polyethylene to the bottle, temperatures of 100° C. and 70° C. of heating gas under 3–4 atm. pressure are used in the annular passage 5 and in the space 7, respectively.

As shown in Figs. 1 and 3, the main supply pipe 10 is fixed to the turn table 8 and is provided with a supply port 11 communicating with an annular supply chamber 12 surrounding said pipe 10 air-tightly but permitting said pipe 10 to rotate freely, As shown in Figs. 1a and 1b, the supply pipe 6 is bent twice and a valve 15 is inserted into the upright portion of said pipe 6. The free end of the valve rod of this valve passing through the upper part of the turn table is pivoted to one end of a lever 16 pivoted to a projection of said upper part. Between this end of the lever 16 and said upper part a spring is intercalated to press the valve 15 against its seat normally. An arcuate cam 17 is arranged concentrically to the turn table and below the same in an angular position corresponding to the highest face 14 of the annular cam 13, so as to lift the free end of the lever 16 sliding on said cam when the carriage 18 is sliding on the highest face 14, whereby the valve 15 is opened to supply heating gas to the annular passage 5, as shown in Fig. 1b.

After a bottle 1 is fed into one of the recesses 9 in a position D shown in Fig. 3 by a suitable means, the bottle is transported one after another with rotation of the turn table 8. On the way of transport a hooding sheet piece 2 is placed on the top portion of the bottle 1 in a position E also by a suitable means. The bottle 1 is then lifted up in a position F by the highest face 14 of the cam 13 and its top portion is inserted into the bore 4 of the cap body 3, while at the same time the valve 15 is opened by the lever 16 sliding on the cam 17, whereby the heating gas is blown against the hooding sheet piece 2. The bottle thus hooded is removed from the recess in a position G.

A bottle onto whose top portion a hooding sheet piece has been placed automatically, as hereinafter explained in detail, can be fed into one of the recesses. In this case, in order to effect several hooding operations at the same time it is possible that from the main supply pipe 10, several radial supply pipes 6 connected with their respective cap bodies are branched off to communicate with respective annular passages 5 of the cap bodies.

As shown in Fig. 4, a vertically movable bottle carriage 18, whose vertical movement can be effected also by a suitable cam may be provided with a vertical cutting edge 19. 20 denotes a holding plate for holding the free end of a hooding sheet band 2' between it and the top portion of the bottle 1 which band is wound onto a roller 27, in front of which a pair of guide rollers 26, 26' are arranged. A guide plate 23 having a recess 22 cut away therefrom to receive the top portion of a bottle is pivoted to a suitable frame of the apparatus (not shown) by trunnions 25, 25 for guiding the sheet band 2' (see Fig. 5). 24 denotes a stopper to limit the downward movement of the plate 23 and maintain the latter in a horizontal position. 28 denotes a stationary cutting edge to cut off in cooperation with the cutting edge 19 a hooding sheet piece 2 from the sheet band 2' when the bottle 1 ascends suitably.

Before beginning the operation the sheet band 2' is drawn out enough to cover the recess 22 of the guide plate 23 as shown in Fig. 6a. When the bottle carriage 18 continues to ascend after the band 2' has been held fast between the plate 20 and the mouth piece of the bottle 1, the plate 23 will be made to swing upwardly by the cutting edge 19, as shown in Fig. 6b, while the band 2' is left intact between the plate 20 and the mouth piece of the bottle to permit a further ascent of the bottle through the recess 22 of the plate 23 till a position shown in Fig. 6c. The bottle continues further to ascend till a position shown in Fig. 6d, where a hooding sheet piece 2 large enough to cover the top portion of the bottle is cut off by the cutting edges 19 and 28 from the sheet band 2' which has been drawn out during the foregoing operation from the roller 27 by a length corresponding to that of the sheet piece 2. The bottle 1 whose top portion is covered with the sheet piece 2 descends then as shown in Fig. 6e till the position shown in Fig. 6a, resulting in simultaneous descent of the plate 23. Descent of the plate 20, however, occurs somewhat later than that of the bottle 1 by means of a suitable arrangement therefor which will be explained hereinafter. Finally the bottle 1 with the sheet piece 2 is fed into one of the recesses 9 of the turn table 8 by a suitable transporting means, where the hooding operation of the bottle is performed, as explained already.

One example of the arrangements for retarding descent of the plate 20 and for preventing the sheet band 2" (see Figs. 6d and 6e) from falling down from its guide plate immediately after cutting of a hooding sheet piece is shown in Figs. 7 and 8. As shown, the holding plate 20 is connected with the lower end of a rod 21, with whose upper end a piston 38 slidable vertically in a cylinder 30 is connected too, which is provided at its uppermost and lowermost parts with inlet or suction valves 33, 35 and which is provided approximately on its lower half with an enlarged portion 31 forming a by-pass 32 to connect two spaces in the cylinder 30 above and below the piston 38 when said piston is positioned in the lower half of the cylinder 30, to whose lower end opens a discharge pipe 37 with a throttle valve 36.

When the holding plate 20 ascends by dint of the bottle 1, the suction valve 33 is closed, while the suction valve 35 is opened, permitting the piston 38 to move upwardly in the cylinder 30, air contained in whose chamber above the piston 38 is discharged then through a discharge valve 34 at the upper end of the cylinder into a discharge pipe 39 to which is connected a pressure accumulator 40. On the contrary, when the carriage 18 descends, the holding plate 20 will descend by its own weight and weights of the piston 38, rod 21, etc., whereby air in the cylinder chamber below the piston 38 will be discharged through the discharge pipe 37 with the throttle valve 36. By adjustment of the throttle valve 36 discharge amount of air per unit time through the pipe 37 can be adjusted optionally, resulting in an optional adjustment, i.e. retardation of descending velocity of the plate 20 relative to that of the carriage 18. Because it is necessary, however, to make the plate 20 descend rapidly after the guide plate 23 has swung down in its horizontal position, a by-pass 32 is provided for making rapid descending velocity of the plate 20 after the piston 38 descends below the upper end of the by-pass 32.

A pipe 39' is led from the pressure accumulator 40 made of an expansible substance such as gum and is connected with a pipe 39" arranged perpendicularly thereto. A nozzle-shaped outlet pipe 29 forming the free end of the pipe 39" is positioned to jet air flow toward the sheet band 2' on the guide plate 23 inclined upwardly. The interconnecting part of the pipes 39' and 39" forms a valve chest of a valve 49 whose valve rod is pivoted to a lever 44 also pivoted to a suitable frame (not shown) of the apparatus by a pin 43. The rod 21 between the plate 20 and the piston 38 is provided with two actuating pieces 41 and 43 which are adapted to cooperate with one end 50 of the lever 44 interposed therebetween, in such a manner that the lever 44 swings about its pin 43 with the vertical movement of the rod 21, resulting in opening and closing of the valve 49. The other end of the lever 44 is provided with two semi-circular recesses 45 and 46, into either of which a steel ball 47 loaded by a spring 48 is pressed to hold the lever 44 surely in either of its two extreme positions.

When the bottle 1 and, consequently, the piston 38 ascend, the suction valve 33 is closed while the discharge valve 34 is opened, through which air in the cylinder chamber above the piston 38 is discharged into the accumulator 40. In this case, the lower actuating piece 42 on the rod 21 ascends too and pushes upwardly the end 50 of the lever 44 in the instant when the sheet band 2" and the guide plate 23 carrying it occupy their positions shown in Fig. 6d, so that the valve 49 is opened to permit compressed air accumulated in the accumulator 44 to flow out through the outlet 29, whereby the sheet band 2" is pressed against the guide plate 23 and is prevented from sliding down from the guide plate 23. In case of descent of the bottle 1, the upper actuating piece 41 of the rod 21 moves downwardly to push down the end 50 of the lever 44, whereby the valve 49 is closed to stop jet flow of air from the outlet 29.

The apparatus according to this invention can operate automatically and efficiently, because it can be provided with an automatic cutting and drawing-out arrangement for a hooding sheet band, as explained hereinfore. This apparatus can be used hygienically and economically, especially in a milk plant, where steam which can be used as heating medium for sticking the hooding sheet piece to the bottle is used always.

From the foregoing it will be seen that many modifications of the specific disclosed form of the invention may be resorted to, and it is to be understood that the scope of the invention is to be ascertained solely by the appended claims.

I claim:

1. A bottle-hooding apparatus comprising in combination means for transporting bottles to be hooded one after another, means for lifting each bottle on the transporting way up to a raised position, means for placing a hooding sheet piece on said top portion, cap means for receiving the top portion of the bottle in said raised position to define together with said top portion an annular space about said top portion, means for supplying heated fluid under pressure to said annular space to press said sheet piece onto said top portion of the bottle, and means for synchronizing lifting movement of the bottle with said last recited means, said cap means including a cap body adapted to receive therein the top portion of a bottle to be hooded, said cap body including a circumferential wall having an annular horizontal passage for heated fluid, said cap body having a bore, said passage opening into said bore along its total length.

2. An automatic feed arrangement for hooding sheet pieces, comprising a vertically movable bottle carriage, vertically movable means cooperating with said carriage for hoding fast the free end of a hooding sheet band between said movable means and the top portion of a bottle and pulling out said band when said carriage ascends, cutting means for cutting off from said band a piece of a required length, said cutting means including a movable cutting edge secured to said bottle carriage and a stationary cutting edge cooperating with said movable cutting edge when the latter occupies its uppermost position, and a pivotally mounted guide plate for said band, said hooding sheet band being pulled out by swinging up of said guide plate.

3. An automatic feed arrangement for hooding sheet pieces, comprising a vertically movable bottle carriage, vertically movable means cooperating with said carriage for holding fast the free end of a hooding sheet band between said movable means and the top portion of a bottle and pulling out said band when said carriage ascends, cutting means for cutting off from said band a piece of a required length, said cutting means including a movable cutting edge secured to said bottle carriage and a stationary cutting edge cooperating with said movable cutting edge when the latter occupies its uppermost position, and holding means for preventing said sheet band from falling down from said guide plate immediately after cutting of the sheet band.

4. An automatic feed arrangement according to claim 3, wherein said holding means includes a cylinder, a rod provided at its lower end with a holding plate and at its upper end with a piston sliding in said cylinder, said cylinder being provided at its upper and lower ends with respective one discharge passage and one suction port and being further provided with a by-pass arranged in its lower half to make the cylinder chambers above and below the piston communicate with each other.

5. An automatic feed arrangement according to claim 4, wherein a throttle valve is inserted into said discharge passage in said lower end.

6. An automatic feed arrangement according to claim 4, wherein a pressure accumulator and a closing valve are inserted into said discharge passage in said upper end.

7. An automatic feed arrangement according to claim 6, wherein said closing valve is controlled dependently upon movement of said rod of means for holding.

8. An automatic feed arrangement according to claim 3, wherein said holding means includes a cylinder, a rod provided at its lower end with a holding plate and at its upper end with a piston sliding in said cylinder, said cylinder being provided at its upper and lower ends with respective one discharge passage and one suction port and being further provided with a by-pass arranged in its lower half to make the cylinder chambers above and below the piston communicate with each other, said hooding sheet band being pressed against said guide plate by fluid under pressure discharged from said cylinder.

References Cited in the file of this patent

UNITED STATES PATENTS

| | | |
|---|---|---|
| 985,803 | Hogkinson | Mar. 7, 1911 |
| 1,011,630 | Lassen | Dec. 12, 1911 |
| 1,266,913 | Braecklein | May 21, 1918 |
| 2,003,682 | Enock | June 4, 1935 |
| 2,042,304 | Glunz | May 26, 1936 |
| 2,286,079 | Gangloff | June 9, 1942 |